United States Patent Office 3,420,896
Patented Jan. 7, 1969

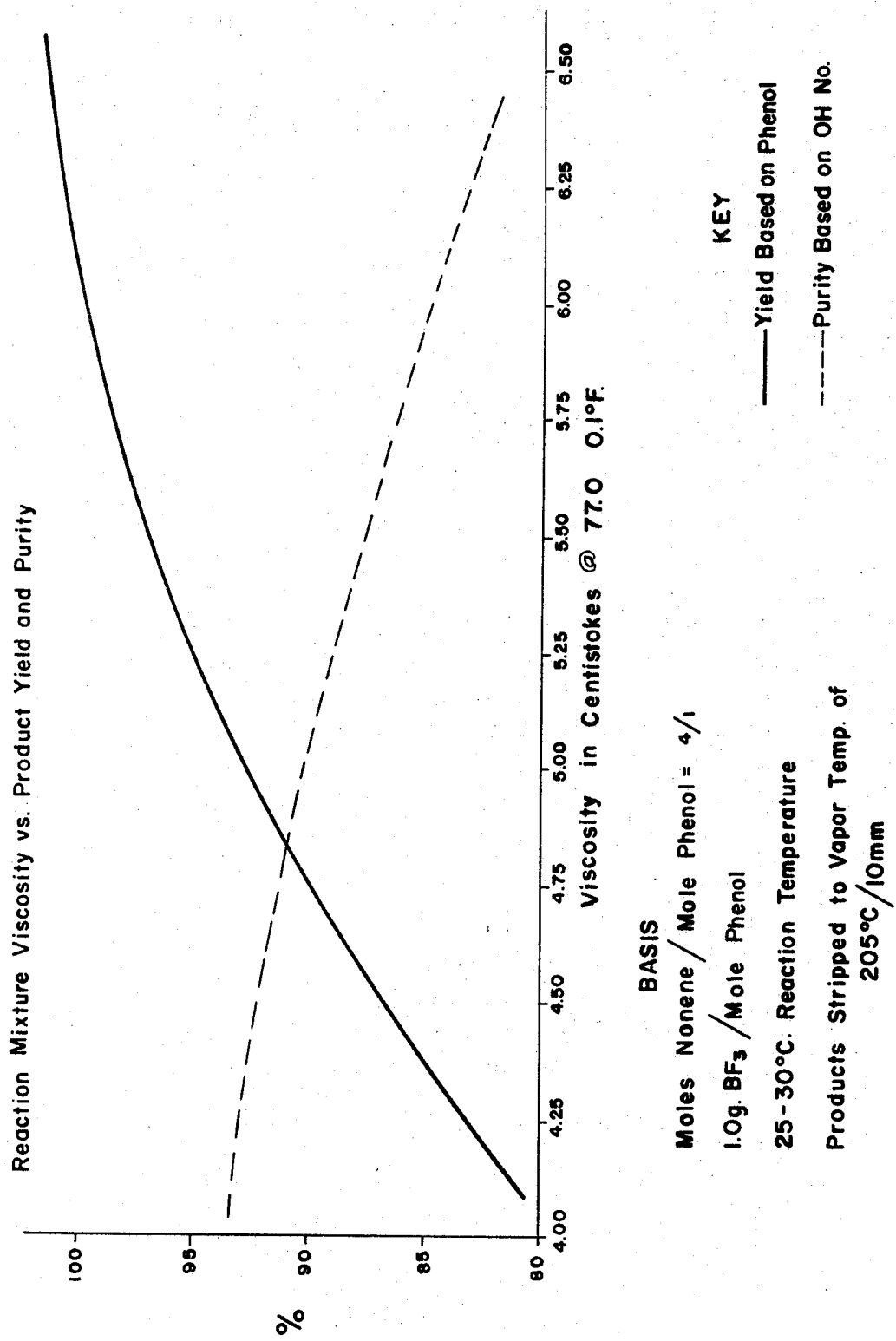

3,420,896
PREPARATION OF DIALKYLPHENOLS
Richard C. Mansfield, Cherry Hill, N.J., assignor to Rohm & Haas Company, Philadelphia, Pa., a corporation of Delaware
Filed Dec. 10, 1963, Ser. No. 329,460
U.S. Cl. 260—624          10 Claims
Int. Cl. C07c 39/06

This invention relates to the production of alkylated phenols by reacting phenolic compounds with olefins in the presence of a suitable catalyst. More particularly, it deals with a new method for manufacturing dialkylphenols in greater yields of product, with greater purity, than heretofore have been possible of attainment.

The present invention contemplates a process in which there is uniquely employed the combination of relatively high mol ratios of olefin to phenol and relatively low reaction temperatures. The reactants are conventional, including the preferred catalyst, $BF_3$, but the results in terms of quantity and quality of product are unexpectedly much superior to any previously obtained.

In U.S. Patent 2,213,477 oxyalkylated dialkylphenols are disclosed in which one of the alkyl groups does not contain over five carbon atoms. This patent deals with oxyalkylated monoalkylphenols, primarily. The methods for their preparation describe the reaction of phenol and olefin at a temperature of 25–30° C., using $BF_3$ as a catalyst. Equimolecular ratios of olefin to phenol are indicated; high olefin/phenol ratios are not even suggested.

In U.S. Patent 2,593,112 oxyalkylated dialkylphenols are disclosed in which the sum of the carbon atoms in the alkyl substituents is greater than 14 and each alkyl substituent contains at least 6 carbon atoms. The dialkylphenols were prepared by reacting an olefin and phenol in the presence of $BF_3$ at about 15–20° C., the mol ratio of olefin phenol being 2/1, and about 4.4 parts of $BF_3$/mol of phenol being used. The maximum yield cited was about 76%, and it was necessary to distill the products before oxyalkylation in order to obtain the emulsifying agents which were the objective of that patent.

In U.S. Patent 2,567,848 there is disclosed a method of alkylating phenols with $C_{14-18}$ olefins in the presence of ZnO and HCl to obtain dialkylphenols to the practical exclusion of trialkylphenols by employing the olefin in equimolecular proportions or in some excess with respect to the phenol. However, temperatures of 60–180° C. must be employed and the products contain appreciable quantities of mono-alkylphenols. Besides alkylated phenols the products contain sizeable amounts of alkylphenyl ethers, polymerized olefins, etc.

According to the present invention, dialkylphenols are now capable of being prepared in the presence of $BF_3$, a gaseous condensing agent, but with much higher yields of product than any known prior art method, and to the practical exclusion of undesirable impurities such as mono-alkylphenols, trialkylphenols, and polyolefins. Instead of employing equimolecular proportions, or an excess of the olefin on the order of 2/1 as has been done in the art previously, at least 3 moles (with a preferred range of 3 to 5 mols) of olefin are caused to react with one mol of phenol in the presence of a catalytic amount of $BF_3$.

Preferably, the amount of $BF_3$ used should be between 0.5 and about 2.0 grams. The more catalyst used, the faster the reaction goes, and more care needs to be exercised to avoid having it get out of desired control. The temperature of the reaction is kept at about 15 to 35° C., with a preferred range of 20° to 30° C.

The combination of a minimum of 3 mols of olefin to each mol of phenol, and the low temperature is critical, as illustrated in the following experiment where 2.5 mols of olefin to phenol was employed along with a reaction temperature of 25–30° C. Too low an olefin/phenol ratio in combination with relatively low temperatures, as taught by U.S. 2,593,112, will not produce the high yields and purity attained by the present invention. An excess of olefin to phenol in combination with relatively high temperatures, as taught by U.S. 2,567,848 also will not produce the high yields and purity attained by the present invention. Only when the minimum excess of olefin, in combiation with the low temperatures, are employed as taught by the present invention, will the desired objectives be attained.

Failure of the reaction to work satisfactorily when the temperature is within the range practiced by the present invention, but the excess of olefin over phenol is below the required minimum of 3 mols is illustrated by this experiment. To a stirred mixture of 94.1 g. of phenol and 2.0 g. of $BF_3$ at 40–50° C. was added 75 ml. of nonene with external cooling during one minute. The mixture was then cooled to 25–30° C. and enough additional nonene was added at that temperature during 10 minutes to bring the total nonene to 315 ml. The mixture was stirred at 25–30° C. for 1½ hours. A 50% aliquot, (205 g.) was decated and neutralized immediatetly with dilute sodium carbonate. The aqueous layer was separated and the organic layer was distilled to give the following fractions.

| Fraction Number | Boiling Range, ° C./mm. Hg | Identity | Weight (parts) |
|---|---|---|---|
| I | 60–140/10 | Unreacted nonene stripped off | (*) |
| II | 140–180/10 | Nonylphenol and dinonene | 8.5 |
| III | 180–205/10 | Nonylphenol and dinonylphenol | 20.5 |
| IV | Residue (product) | Dinonylphenol | 132.5 |

*Not collected and weighed.

This corresponds to only a 76.3% yield of product contaminated by more than 3.5% of mono-p-alkylphenol.

In the method of the present invention the reaction is run until the viscosity of the reaction mixture reaches a specified range which is dependent upon the mol ratio of olefin to phenol. The time required to reach that viscosity will depend upon a number of factors, such as temperature, concentration of the catalyst, the moisture content of the phenol, the presence or absence of alcohol in the olefin, etc. As an indication of the extent to which the time required may vary, good results can be achieved in one-half hour in some instances and as much as five hours in others. Table I below, which illustratively lists some screening runs, shows some of the different results obtained as the time of the reaction is varied. The reaction is stopped at the desired point by the addition of a base such as aqueous sodium carbonate or lime.

TABLE I.—REPRESENTATIVE SCREENING RUNS*

| Mols Nonene/Mols Phenol | Time, Min. | G. BF$_3$/mol Phenol | Percent Yield (Product) | Percent "Purity" (Product) |
|---|---|---|---|---|
| 3/1 | 180 | 0.5 | 86.0 | 88.7 |
| 3/1 | 270 | 0.5 | 85.2 | 88.6 |
| 3/1 | 150 | 1.0 | 89.6 | 88.2 |
| 3/1 | 240 | 1.0 | 92.5 | 87.4 |
| 3/1 | 30 | 1.5 | 91.0 | 86.5 |
| 3/1 | 180 | 1.5 | 100.3 | 73.1 |
| 4/1 | 30 | 1.0 | 59.5 | 94.2 |
| 4/1 | 90 | 1.0 | 79.9 | 93.3 |
| 4/1 | 120 | 1.0 | 89.5 | 92.1 |
| 4/1 | 180 | 1.0 | 93.8 | 90.7 |
| 4/1 | 240 | 1.0 | 97.1 | 87.7 |
| 4/1 | 30 | 1.5 | 93.8 | 88.3 |
| 4/1 | 120 | 0.5 | 98.8 | 83.6 |
| 5/1 | 120 | 0.5 | 35.0 | 95.6 |
| 5/1 | 240 | 1.5 | 47.0 | 94.4 |
| 5/1 | 90 | 1.0 | 89.0 | 92.9 |
| 5/1 | 180 | 1.0 | 97.8 | 88.2 |
| 5/1 | 180 | 1.0 | 97.8 | 88.2 |
| 5/1 | 240 | 1.0 | 99.3 | 87.4 |
| 5/1 | 270 | 1.0 | a 96.0 | a 90.0 | a Inconsistency believed due to atmospheric moisture contamination.
*The experiments which led to the obtainment of these data were run as follows: Phenol and BF$_3$ were weighed into a clean, dry, 1-liter, 3-neck flask equipped with thermometer, stirrer and addition funnel with attached drying tube. To the stirred mixture was added 100 ml. (73.3 g.) of tripropylene polymer (nonene) during 2 minutes while the temperature was controlled at 45–55° C. The remainder of the nonene was then added during 13 minutes at 25–30° C. and the mixture was stirred for the specified time at 25–30° C. There was then added a 5% solution of aqueous Na$_2$CO$_3$ (100 ml./g. BF$_3$) and the mixture was stirred for ½ hour. The aqueous layer was separated and the organic layer was distilled.

The product obtained is in very high yield and, after removal of the excess olefin, is of relatively high purity, containing only low percentages of mono-alkylphenol and higher boiling trialkylphenols and polyolefins. The concentration of higher boiling materials in the product is so low that, without distillation, the product has a purity of >90% as measured by hydroxyl number. If desired, the small amounts of lower boiling mono-alkylphenols and olefin dimer which are present may be removed by a simple stripping operation.

Rigid control of the olefin/phenol ratio and the temperature variables is absolutely critical to the successful attainment of the objects of the invention. Temperatures above 35° C. will cause lower yields of dialkylphenols and proportionately greater amounts of impurities to form. If the specified viscosity range is not reached the product will contain either a relatively greater percentage of mono-alkylphenol or a greater precentage of trialkylphenol and polyolefins.

The process of carrying out the invention is subject to numerous variations, all within the scope of the broad concept thereof. For example, the olefin may be added to a mixture of phenol and BF$_3$, or the BF$_3$ may be added to a mixture of phenol and olefin. When the olefin is added to a mixture of phenol and BF$_3$, it is necessary to have the reaction temperature above the melting point (but generally not higher than 65° C.) until enough olefin has been added so that the temperature can be dropped to the desired range. This usually takes about 50–75 parts of olefin/94 parts of phenol, and in no way is harmful to the yield or purity of the final product.

Another way, which also gives good yields and highly pure products, is to add the olefin to a mixture of BF$_3$ and phenol which has been either partially or completely converted previously to the corresponding mono-alkylphenol. The preferred method, however, is to add 50–75 parts of the olefin to a mixture of 94 parts of phenol and 0.5 to 2 parts of BF$_3$ at a temperature sufficient to melt the phenol (usually 40–65° C.), lower the temperature to 15–35° C., add the remainder of the olefin, and then stir at the specified temperature until the reaction is completed.

The multiplicity of variables and their effect on the course of the reaction make it desirable, in actual plant manufacturing operations, to have a simple means of maintaining quality control. Periodic viscosity tests of the reaction mixture serves this purpose quite well. As an illustration, see the accompanying drawing which shows the relationship of reaction mixture viscosity to yield and purity of product for a number of preparations, using fresh reactants for each run. In that illustration it is indicated that a reaction mixture viscosity of 4.75–5.07 cs. at 77.0±0.1° C. should give at least 90% of product with a purity of at least 90%. Similar graphs can be provided quite simply for other reactants and reactant ratios, and thus enable the plant operator to determine when to terminate the reaction in order to obtain the most saisfactory product.

Alkylatable aromatic compounds having a phenolic hydroxy group as a class may be successfully alkylated by the new method. Phenolic compounds having at least two replaceable hydrogen atoms are suitable starting compounds for dialkylation.

As olefinic alkylating agents there may be used in the process, olefins of two to twenty-five carbon atoms per molecule may be useful. Tertiary olefins, alone or in mixtures with primary and/or secondary olefins, are particularly useful. It also may be found useful to employ mixtures of primary and secondary olefins or just one or the other of these olefins alone. The process is especially advantageous with the higher, normally liquid olefins. Cyclic olefins such as cyclopentene, cyclohexene, the alkyl cyclopentenes and cyclohexenes, for example the methyl cyclopentenes, etc., octahydronaphthalene, and the like may also be suitable alkylating agents according to the invention. The olefins may be used as pure or substantially pure compounds or as mixtures of two or more olefins with or without other compounds which do not interfere with the reaction. Thus, mixtures of olefins obtained by cracking petroleum hydrocarbons or other carbonaceous materials are suitable alkylating agents. Such cracking products usually contain nonolefinic hydrocarbons of similar boiling point such as paraffins, naphthenes or aromatic hydrocarbons which need not be removed before using the olefins as alkylating agents. Olefin polymers, particularly dimers, trimers and tetramers of the lower olefins such as propylene, isobutylene and the like or copolymers of different olefins, for example isobutylene and the normal butylenes or propylene, are especially useful alkylating agents in the process of the invention, particularly where the production of branched chain alkyl phenolic compounds is desired.

EXAMPLE I

Example I is a typical preparation according to the preferred process. The drawing represents a plot of reaction mixture viscosity vs. percent yield and purity of the product when the reactions are carried out by the same process. It demonstrates the need for good viscosity control to obtain products in 90% yield with 90% purity.

Into a clean, dry 1 liter, 3-neck flask equipped with thermometer, stirrer, and addition funnel with attached drying tube were weighed 94.7 parts of phenol and 1.0 part of BF$_3$. To this stirred mixture was added dropwise during 75 minutes at 65–70° C. about 73 parts of nonene. The mixture was then cooled to 25° C. during 20 minutes and maintained at 25–30° C. for 1 hour while there was added additional nonene so that the total nonene added amounted to 507 parts. The mixture was then stirred for another 68 minutes, at which time the viscosity was 4.95 cs. at 77.0±0.1° F. The mixture was neutralized by the addition of 100 parts of an aqueous solution containing 5 parts of sodium carbonate and then allowed to stir for ½ hour. The aqueous layer was separated and one-half of the organic layer (299.3 parts) was distilled to give the following fractions.

| Fraction Number | Boiling Range, ° C./mm. Hg | Identity | Weight (parts) |
|---|---|---|---|
| I | 58/48–70/7 | Unreacted nonene | 122 |
| II | 136–180/10 | Nonylphenol and dinonene | 10 |
| III | 180–206/10 | Nonylphenol and dinonylphenol | 5 |
| IV | Residue (products). | Dinonylphenol | 160 |

The product had a hydroxyl number of 146.1. This corresponds to a 92.4% yield of product with a purity of 90.4% based on hydroxyl number. Other than recovered nonene there was obtained only about 5% by weight of lower boiling impurities (nonylphenol and dinonene). In addition, infrared analysis indicated that the product contained less than one-half of one percent of mono-p-alkyl-phenols.

stand for ½ hour. The aqueous layer was removed and the organic layer was then distilled through the Oldershaw column. Charge to still=738 g.

| Fraction | Identity | Boiling Range, ° C./mm. Hg | Wt., g. | OH-Number |
|---|---|---|---|---|
| I | Nonene | 58/125–58/10 | (¹) | |
| II | Nonene dimer | 129–140/10 | 4.3 | ² 35 |
| III | Nonylphenol | 140–180/10 | 100.5 | 217.3 |
| IV | Nonylphenol plus dinonylphenol. | 180–207/10 | 17.3 | |
| V | Dinonylphenol | 207–225/10 | 440.6 | 155.3 |
| Residue | Higher polyalkylphenols and poly-olefins. | | 110.3 | 42.2 |

¹ 44.2 oil plus 7.4 water.
² Estimated.

EXAMPLE II

To a stirred mixture of 229 parts of nonylphenol (OH No.=245) and 369 parts of nonene was added 1.1 parts of $BF_3$ during 15 minutes while the temperature was maintained at 25–30° C. The mixture was stirred for 38 minutes at 25–30° C. at which time the viscosity was 5.18 cs. at 77.0±0.1° F. There was added 60 parts of 10% sodium carbonate solution and the mixture was stirred ½ hour. The lower aqueous layer was separated and the organic layer was washed once with 60 parts of water. One half (299 parts) was distilled free of excess nonene and other materials boiling lower than the product.

| Fraction Number | Boiling Range, ° C./mm. Hg | Identity | Weight (parts) |
|---|---|---|---|
| 1 | Up to 60/10 | Nonene | 122 |
| 2 | 130–140/10 | Nonene dimer | 3 |
| 3 | 140–180/10 | Nonylphenol | 10 |
| 4 | 180–205/10 | Nonylphenol and dinonylphenol | 6 |
| 5 | Residue (product). | Dinonylphenol | 157 |

The product had a hydroxyl number of 148.3. This corresponds to a 90.9% yield of product with a purity of 92.0% based on hydroxyl number. Other than recovered nonene there was obtained only about 6.4% by weight of lower boiling impurities (nonene dimer and nonylphenol). In addition infrared analysis indicated that the product was free of contamination from any mono-p-alkylphenols.

EXAMPLE III

To 188.2 g. (2.00 moles) of U.S.P. phenol in a 1-liter, 3-neck flask equipped with stirrer, thermometer, drying tube ($CaCl_2$), and gas inlet tube was added 3.0 g. of $BF_3$ at 40–50° C. The gas inlet tube was replaced by a dropping funnel. To the stirred mixture of phenol and $BF_3$ was added during 15 minutes 555 g. (4.40 moles) of tripropylene polymer while the temperature rose to and held at 53–56° C. The mixture was stirred at 53–56° C. for 2 hours. The Gardner-Holdt viscosity of a sample at that time was H−. There was added 150 ml. of an aqueous solution containing 9.5 g. of sodium carbonate, the mixture was stirred at 85–90° C. for ½ hour, and allowed to stand for ½ hour. The aqueous layer was removed and the organic layer was washed once with 150 g. of hot water (85–90° C.) for ½ hour, and allowed to It will be noted that in Example III the reaction temperature is considerably above the maximum temperature at which the invention can be successfully practiced. Also, it will further be noted that the mol ratio of olefin to phenol is considerably below the minimum required for the successful operation of the invention. As a result, this example indicates the sort of low yields of products and the high amount of residue and monoalkylphenols which are obtained by such prior art methods.

I claim:
1. A process for the production of dialkylphenols in high yields and of high purity which comprises reacting at least a total of 3 mols of an olefin for each mol of phenol by carrying out the reaction at a temperature of about 15–35° C. in the presence of at least a catalytic amount of $BF_3$.

2. The process of claim 1 followed by the steps of adding a base to the reaction mixture in order to terminate the reaction at desired point, and then distilling off from the mixture the excess olefin and other lower boiling fractions.

3. The process of claim 1 in which at least a portion of the phenol has previously been converted to monoalkylphenol by reacting it with a portion of the olefin.

4. A process for the production of dinonylphenol which comprises reacting at least 3 mols of nonene for each mol of phenol by carrying out the reaction at about 20–30° C. in the presence of at least 0.5 g. of $BF_3$ for each mol of phenol.

5. The process of claim 4 following by the steps of adding a base to the reaction mixture in order to terminate the reaction at a desired point, and then distilling off from the mixture the excess olefin and other lower boiling fractions so as to leave behind the dialkylphenols.

6. A process for the production of dialkylphenols which comprises adding at least 3 mols of an olefin to a mixture of at least a catalytic amount of $BF_3$ and a mol of phenol, which mixture is kept at a temperature sufficient to melt the phenol prior to and during the addition of a portion of the olefin, lowering the temperature to about 15–35° C. not later than immediately after the olefin has been added, and maintaining the temperature of the reaction at about 15–30° until the dialkylphenol has been formed.

7. A process for the production of dialkylphenols which comprises reacting at least 3 mols of an olefin for each mol of phenol by heating a mixture of the two in the presence of $BF_3$, said reaction being carried out by adding to each mol of phenol from 50 to 75 parts of the olefin and about 0.5 to 2 parts of $BF_3$ at a temperature of about 40–65° C., lowering the temperature to about 15–35° C., adding the remainder of the olefin, then stirring at the lowered temperature until the dialkylphenol has been substantially fully formed.

8. The process of claim 6 in which up to 5 mols of the olefin are added for each mol of phenol.

9. The process of claim 7 in which up to 5 mols of the olefin are added for each mol of phenol.

10. A process for the production of dialkylphenols which comprises adding at least a catalytic amount of $BF_3$ to a mixture of olefin and phenol which are in a mol ratio of at least 3:1, and reacting the mixture at a temperature of about 15–35° C.

References Cited

UNITED STATES PATENTS

| | | | |
|---|---|---|---|
| 2,593,112 | 4/1952 | Cross et al. | 260—624 |
| 3,071,595 | 1/1963 | Vesely et al. | 260—624 |

LEON ZITVER, *Primary Examiner.*

W. B. LONE, *Assistant Examiner.*